Figure 1:
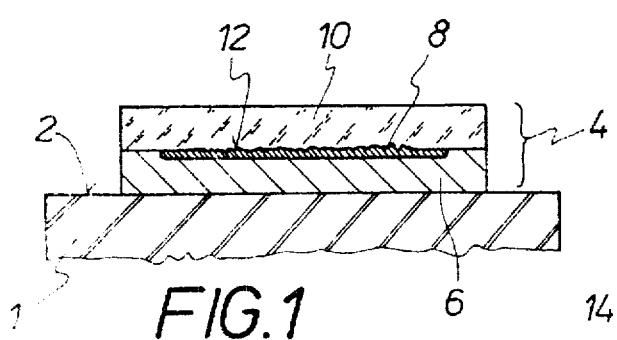

United States Patent [19]

Reinhart et al.

[11] Patent Number: 5,763,051
[45] Date of Patent: Jun. 9, 1998

[54] STRUCTURE ARRANGEMENT WITH A RELIEF STRUCTURE HAVING AN OPTICAL-DIFFRACTION EFFECT

[75] Inventors: Werner Reinhart, Nürnberg; Jürgen Herrmann, Alsbach, both of Germany

[73] Assignee: Leonhard Kurz GmbH & Co./Deutsche Bundesbank, Furth, Germany

[21] Appl. No.: 765,296

[22] PCT Filed: Jun. 22, 1995

[86] PCT No.: PCT/DE95/00827

§ 371 Date: Jan. 27, 1997

§ 102(e) Date: Jan. 27, 1997

[87] PCT Pub. No.: WO96/01457

PCT Pub. Date: Jan. 18, 1996

[30] Foreign Application Priority Data

Jul. 2, 1994 [DE] Germany ............... 44 23 293.4

[51] Int. Cl.⁶ ..................................... B32B 3/00
[52] U.S. Cl. ................. 428/195; 428/913; 428/916; 283/91; 283/94
[58] Field of Search ..................... 428/195, 199, 428/913, 916; 283/86, 91, 94, 107

[56] References Cited

U.S. PATENT DOCUMENTS

| | | | |
|---|---|---|---|
| 4,589,686 | 5/1986 | McGraw | 283/85 |
| 5,059,776 | 10/1991 | Antes | 235/457 |
| 5,101,184 | 3/1992 | Antes | 235/454 |
| 5,447,335 | 9/1995 | Haslop | 283/91 |

Primary Examiner—William Krynski
Assistant Examiner—Elizabeth Evans
Attorney, Agent, or Firm—Louis E. Marn

[57] ABSTRACT

In order to improve a structure arrangement comprising a plurality of portions having a relief structure with an optical-diffraction effect, in particular for visually identifiable optical security elements for value-bearing documents, for example banknotes, credit cards, passes or cheque documents, or other articles to be safeguarded, with a first group of portions with a first structure having an optical-diffraction effect, which first group is disposed on a surface region of the structure arrangement, and at least one further group of portions with a further structure which has an optical-diffraction effect and which is different from the first structure, in such a way that a given item of information can be imparted to a viewer of the structure arrangement with a high level of intensity and uniformly over the entire extent of a preselected viewing angle range, it is proposed that the structure of the portions of the first and the at least one further group respectively is such that, upon illumination of the structure arrangement, visually perceptible items of information originating from the portions of different groups are identical, as viewed from different sub-ranges of the viewing angle range.

5 Claims, 1 Drawing Sheet

STRUCTURE ARRANGEMENT WITH A RELIEF STRUCTURE HAVING AN OPTICAL-DIFFRACTION EFFECT

The invention concerns a structure arrangement comprising a plurality of portions having a relief structure which has an optical-diffraction effect, in particular for visually identifiable, optical security elements for value-bearing documents, for example banknotes, credit cards, passes or cheque documents, or other items to be safeguarded, wherein disposed on a surface region of the structure arrangement are a first group of portions with a first structure having an optical-diffraction effect and at least one further group of portions with a further structure which has an optical-diffraction effect and which is different from the first structure.

In the simplest case a structure arrangement of that kind is afforded by a rectilinear wave or corrugation structure which is disposed on the surface of a carrier element and at which incident ambient light is reflected with diffraction and/or refraction. In the form of the reflected light, a viewer can receive a visually perceptible item of information which corresponds to the relief structures of the portions, which structures have an optical-diffraction effect, the information being dependent inter alia on the viewing angle.

Diffraction of incident ambient light at the relief structures of the portions and thus the information which is emitted therefrom in the form of an optical diffraction image are determined by the number of wave or grating lines per unit of length of a portion, the so-called spatial frequency, and by the cross-sectional shape of the relief structure which is defined inter alia by the differences in respect of height in the relief structure, more specifically both by the differences in respect of height between the individual raised portions relative to each other, and also between raised portions and troughs of the relief structure. The relief structures of the portions or of the groups of portions can be of such a configuration and the portions can be so arranged that a given item of information, issuing from a given group of portions, can be emitted in a given viewing angle range and thus perceived by a viewer, while in another viewing angle range no information or another item of information can be perceived.

By virtue of the use of per se known security elements with a structure arrangement having an optical-diffraction effect, in regard to the articles to be safeguarded, as were referred to in the opening part of this specification, it is possible for items of authenticity information in respect of the safeguarded article to be rendered visible even to the unpractised lay person, and at the same time for forgery, for example in the form of duplication, having regard to known forgery procedures, in particular optical duplication procedures, to be rendered impossible or made sufficiently difficult.

The endeavour is so to design a structure arrangement that a visually perceptible item of information produced therefrom satisfies aesthetic aspects so that a viewer has for example a particularly brilliant or highly homogenous, uniform image impression which for example can include a symbol or character which provides an item of information. However the endeavour can also be to arouse, on the part of the viewer, the impression of a particularly brilliant colour representation or the impression of highly homogenous uniform colouring.

In the past, the attempt was made to achieve that by the portions, as the smallest carrier unit of a given item of optical information, so-called pixels, being of a dimension of the order of magnitude of about 60×60 μm; however, pixels are also used, whose dimension is considerably less than the specified value.

In regard to the design of structure arrangements, the aim of providing a viewer with a given item of visually perceptible information which issues from an in particular limited surface region of the structure arrangement, over a comparatively large viewing angle range, is frequently found to give rise to problems. Thus it may be desirable for example to provide a viewer with a red colour impression, using structure arrangements within a viewing angle range which is about 30° relative to its vertical line on the surface region being viewed.

Known structure arrangements include, on the viewed surface region, a group of portions with a given structure which bears the desired item of information, for example a red colour impression. However, the diffraction image or pattern which is emitted using such a structure arrangement, when the structure arrangement is illuminated, does not afford the same given item of information, over the entire, comparatively large viewing angle range. In this respect, a comparatively large viewing angle range is intended to be interpreted as meaning that, when viewing at different angles within that range, differences in the information communicated can be detected with the naked eye, that is to say for example a colour impression which changes from red to orange is perceived. In addition, known structure arrangements are found to suffer from the disadvantage that, in a given viewing direction, only a small part of the diffraction radiation which is emitted from each of the portions and thus only a low level of intensity can be perceived by the viewer.

The object of the present invention is to provide a structure arrangement of the kind set forth in the opening part of this specification, which makes it possible to give a viewer a given, visually perceptible item of information uniformly and with a high level of intensity, over the entire extent of a predetermined viewing angle range, while the structure arrangement is to be simple and economical to produce.

In accordance with the invention, in the structure arrangement as described in the opening part of this specification, that object is attained in that it cannot be resolved with the naked eye and that the structure of the portions of the first or the at least one further group respectively is such that, upon illumination of the structure arrangement, visually perceptible items of information originating from the portions of different groups are identical, viewed from different sub-ranges of a viewing angle range.

In the case of such a structure arrangement which is designed in accordance with the invention, the information which is desired over a predetermined viewing angle range is emitted or communicated from the portions of the first or the at least one further group in dependence on the viewing angle. It is possible for the structure of the respective portions involving different group allocations to be so designed that the sub-ranges of the viewing angle range which are addressed by same overlap each other. Preferably the respective structures are of such a configuration that the sub-ranges of the viewing angle range adjoin each other.

It is particularly advantageous if there are provided more than two groups of portions with mutually differing structures as then a predetermined viewing angle range can be broken up into a plurality of sections. Each of the sections is then allocated to another group of portions. The item of information which can be perceived within a section then originates from the respective structure of the group of portions, which is associated with said section. In accordance with the invention, in order to arouse a uniform image impression on the part of a viewer, it is proposed that the portions involving different group allocations are arranged alternately on the surface region which is being viewed. It is then not possible for a viewer to detect whether or that, when there is a change in the viewing angle, there is also a change from a group of portions, which is just "active", to another group. It is also proposed that the portions of the respective groups are arranged in a line-wise manner, in particular in such a way that a line of portions of a structure is followed by a line of portions of another structure.

In a development of the invention, in particular in the case of the line-wise arrangement of the portions, it is proposed that the portions are of a strip-like or band-like configuration, that is to say, the portions involve a longitudinal extent which exceeds their transverse extent by a multiple. The strip-like or band-like configuration of the portions also reduces the undesired influence of the transitional regions between relief structures of mutually adjoining portions, such influence manifesting itself in undesired additional diffraction phenomena. Furthermore, the number and the total surface area of the regions which do not contribute to communicating information or which make an only immaterial contribution to communicating information are drastically reduced, for example the number and surface area of the corner regions of square portions with in particular curved relief lines which decrease in length towards the corners.

Further features, details and advantages of the invention are apparent from the accompanying drawing and from the following description of preferred embodiments of the structure arrangement according to the invention.

Figure 2:
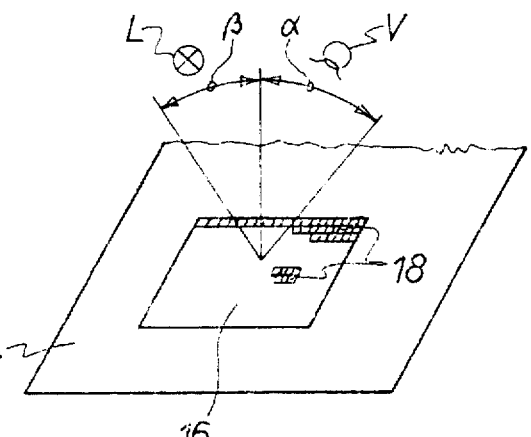
Figure 3:
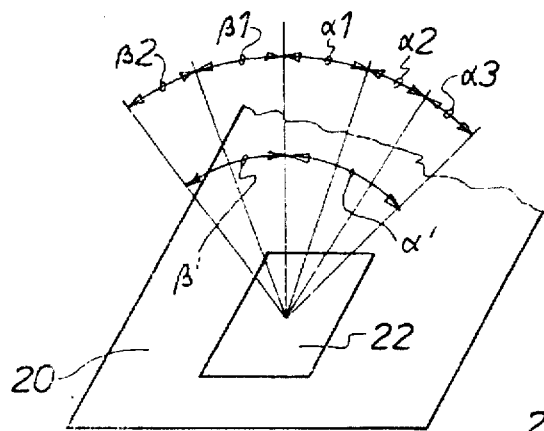
Figure 4:
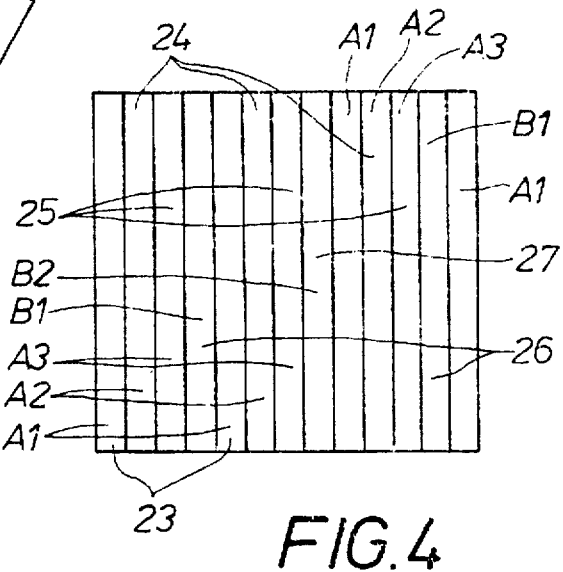
Figure 5:
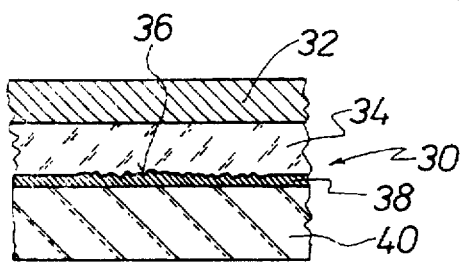

In the drawing:

FIG. 1 is a diagrammatic view of an article to be safeguarded, with a security element, FIG. 2 is a diagrammatic view of the information-bearing diffraction image or pattern in the case of a structure arrangement in accordance with the state of the art, FIG. 3 is a diagrammatic view of the information distribution of the diffraction image or pattern, in a structure arrangement in accordance with the invention, FIG. 4 shows a preferred embodiment of a structure arrangement according to the invention for producing the information distribution shown in FIG. 3, and FIG. 5 shows a transfer foil for a structure arrangement according to the invention.

FIG. 1 shows an article 1 to be safeguarded, for example a cheque card comprising plastic material, or the like. A security element which is generally identified by reference numeral 4 is provided on a surface 2 of the article 1 to be safeguarded. The security element 4 includes a substrate region 6, a thin metal layer 8 and a transparent cover layer 10. On its side towards the article 1 to be protected, the cover layer 10 has a relief-like surface structure 12 which comprises wave or grating lines—hereinafter referred to as a structure arrangement -, to which the metal layer 8 was applied, in particular by a vapour deposition procedure.

In FIG. 2, reference numeral 14 denotes a structure arrangement in accordance with the state of the art and reference numeral 16 denotes a surface region, which is to be described in greater detail hereinafter, of that structure arrangement. Upon illumination with a light source L, as can be afforded for example in the form of diffuse daylight, that produces a diffraction image or pattern which is caused by relief-like surface structures of portions 18 of the structure arrangement 14 and by means of which a visually perceptible item of information can be imparted to a viewer V in per se known manner. The portions 18 have surface structures which cannot be shown in FIG. 2 and which are responsible for communication of visually perceptible items of information in the diffraction image or pattern which is produced when the structure arrangement is illuminated. Thus, in the illustrated situation, for viewing angles which lie within a viewing angle range $\alpha$ illustrated in FIG. 2, a given item of optical information is to be transmitted, for example in the form of a red colour impression which is to extend over the entire surface region 16. For another viewing angle range which is indicated by the angle $\beta$ relative to a plane disposed vertically on the structure arrangement, the surface region 16 is to appear green to a viewer. Since, as is known, the information which is transmitted by means of a structure having an optical-diffraction effect, in the form of a diffraction image, depends on the orientation of the structure or the portions carrying same, with respect to the viewing direction, it is strictly speaking only possible to communicate a given discrete item of information within a very small viewing angle range. The consequence of this is that a viewer V does not perceive the same item of information—red colour impression—within the entire viewing angle range $\alpha$, but possibly receives a colour impression which changes from red to orange in dependence on the viewing angle. The intensity of the communicated colour impression will also vary over the viewing angle range.

FIG. 3 is a diagrammatic view, corresponding to FIG. 2, illustrating the distribution of information within the diffraction image or pattern when using a structure arrangement 20 according to the invention, of which a surface region 22 is indicated. The surface region 22 is of such a configuration that the surface region 22 appears red to a viewer V within a viewing angle range $\alpha'$, whereas it appears green within a viewing angle range $\beta'$. Unlike the situation with the structure arrangement 14 shown in FIG. 2, not just portions of a single structure having an optical-diffraction effect are used to produce the red colour impression within the viewing angle range $\alpha'$, but there are groups 23, 24, 25 of portions with a structure A1, A2 and A3 respectively which differ from each other in accordance with their group allocation.

FIG. 4 shows a part of the surface region 22. It includes portions of the groups 23, 24, 25 for producing and communicating the red colour impression and portions of groups 26, 27 for producing and communicating the green colour impression. In that respect, portions of the group 23 with a structure A1 are responsible for emission of the given red colour impression in a sub-range $\alpha 1$ of the viewing angle range $\alpha'$ and portions of the groups 24 and 25 respectively with the structures A2 and A3 respectively are responsible for the sub-ranges $\alpha 2$ and $\alpha 3$. In corresponding manner, the portions of groups 26 and 27 bear structures B1 and B2 respectively with an optical-diffraction effect, for communicating the other given item of information—the green colour impression—in sub-ranges $\beta 1$ and $\beta 2$ respectively of the viewing angle range $\beta'$.

Upon a change in the viewing angle, for example from the sub-range $\alpha 1$ into the sub-range $\alpha 2$, the group 24 of portions of the structure 2A takes the place of the group 23 of portions of the structure A. If the individual portions are so dimensioned that they cannot be resolved with the naked eye, such a change from a group of "active portions" to another will not be noted by a viewer; the desired colour impression is communicated to the viewer uniformly and with a high level of intensity over the entire viewing angle range $\alpha 1$ and $\beta 1$ respectively.

FIG. 5 shows a simple structure, in principle, of a transfer foil 30 according to the invention, with an upper carrier foil 32 which is to be removed after the structure arrangement has been applied to an article to be safeguarded. A transparent layer 34 with a structure arrangement 36 according to the invention adjoins the side of the carrier foil 32, which is towards the article to be safeguarded; the structure arrangement 36 is provided, by vapour deposition, with a thin metal layer 38. Finally the transfer foil has an adhesive layer 40, by means of which the assembly can be joined to an article to be safeguarded.

We claim:

1. A structure arrangement comprising a plurality of portions having a relief structure which has an optical-diffraction effect, in particular for visually identifiable, optical security elements for value-bearing documents, for example banknotes, credit cards, passes or cheque documents, or other items to be safeguarded, wherein disposed on a surface region of the structure arrangement are a first group of portions with a first structure having an optical-diffraction effect and at least one further group of portions with a further structure which has an optical-diffraction effect and which is different from the first structure, characterised in that the portions are so dimensioned that they cannot be resolved with the naked eye and that the structure of the portions of the first group and the at least one further group respectively is such that, upon illumination of the structure arrangement, visually perceptible items of information originating from the portions of different groups are identical, viewed from different sub-ranges of a viewing angle range.

2. A structure arrangement according to claim 1 characterised in that the structure of the portions of the respective group is such that the various sub-ranges follow each other or adjoin each other.

3. A structure arrangement according to claim 1 or claim 2 characterised in that portions involving different group allocations are arranged alternately.

4. A structure arrangement according to claim 3 characterised in that portions of a group are arranged in line form.

5. A structure arrangement according to claim 4 characterised in that lines of portions of a structure and lines of portions of another structure are arranged alternately.

* * * * *